US010705773B2

(12) United States Patent
Sasaki et al.

(10) Patent No.: US 10,705,773 B2
(45) Date of Patent: Jul. 7, 2020

(54) PRINTING APPARATUS, CONTROL METHOD THEREOF AND STORAGE MEDIUM

(71) Applicant: CANON KABUSHIKI KAISHA, Tokyo (JP)

(72) Inventors: Tatsunori Sasaki, Kawasaki (JP); Hironori Nakamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/362,372

(22) Filed: Mar. 22, 2019

(65) Prior Publication Data

US 2019/0303049 A1 Oct. 3, 2019

(30) Foreign Application Priority Data

Mar. 30, 2018 (JP) .................. 2018-066479

(51) Int. Cl.
| | | |
|---|---|---|
| *H04N 1/00* | (2006.01) | |
| *G06F 3/12* | (2006.01) | |
| *G06F 3/06* | (2006.01) | |
| *G06K 15/02* | (2006.01) | |

(52) U.S. Cl.
CPC ............ *G06F 3/122* (2013.01); *G06F 3/0604* (2013.01); *G06F 3/068* (2013.01); *G06F 3/0656* (2013.01); *G06F 3/0659* (2013.01); *G06F 3/1238* (2013.01); *G06K 15/1817* (2013.01)

(58) Field of Classification Search
CPC .... G06F 3/0604; G06F 3/1238; G06F 3/0656; G06F 3/122; G06F 3/068; G06F 3/0659; G06K 15/1817

USPC ........................................................ 358/1.16
See application file for complete search history.

(56) References Cited

U.S. PATENT DOCUMENTS

2010/0223510 A1* 9/2010 Nakanishi ............. G06F 11/008
714/718
2015/0350479 A1* 12/2015 Nogawa ............. H04N 1/00912
358/1.2

FOREIGN PATENT DOCUMENTS

JP 2009-55457 3/2009

OTHER PUBLICATIONS

U.S. Appl. No. 16/356,471, filed Mar. 18, 2019 by Hironori Nakamura.

* cited by examiner

*Primary Examiner* — Saeid Ebrahimi Dehkordy
(74) *Attorney, Agent, or Firm* — Venable LLP

(57) ABSTRACT

An object of the present invention is to suppress a printing apparatus from becoming unavailable due to the life of a nonvolatile memory ending. The present invention is a printing apparatus including: a volatile memory; a nonvolatile memory in which a rewrite of data is performed in units of blocks and whose number of times of rewrite has an upper limit; and a management unit configured to manage a use of the volatile memory and the nonvolatile memory as a spool buffer temporarily storing print data, and the management unit limits the use of the nonvolatile memory based on an estimated life of the nonvolatile memory, which is different from state information indicating a state of a defective block of the nonvolatile memory.

23 Claims, 8 Drawing Sheets

Pre_EOL_Information

| Value | Meaning | Contents |
|---|---|---|
| 0x00 | not defined | — |
| 0x01 | normal | less than 80% of alternative blocks consumed |
| 0x02 | warning | 80% of alternative blocks consumed |
| 0x03 | emergency | alternative blocks have run ou |
| 0x04~0xFF | spare | — |

FIG.6

Device life time estimation

| Value | Contents |
|---|---|
| 0x00 | — |
| 0x01 | 0% to 10% of device life used |
| 0x02 | 10% to 20% of device life used |
| 0x03 | 20% to 30% of device life used |
| 0x04 | 30% to 40% of device life used |
| 0x05 | 40% to 50% of device life used |
| 0x06 | 50% to 60% of device life used |
| 0x07 | 70% to 80% of device life used |
| 0x08 | 80% to 90% of device life used |
| 0x09 | 90% to 100% of device life used |
| 0x0A | maximum value of estimated device life exceeded |
| Others | — |

FIG.7

PRINTING APPARATUS, CONTROL METHOD THEREOF AND STORAGE MEDIUM

This application claims the benefit of Japanese Patent Application No. 2018-066479, filed Mar. 30, 2018, which is hereby incorporated by reference wherein in its entirety.

BACKGROUND OF THE INVENTION

Field of the Invention

The present invention relates to a printing apparatus, a control method thereof, and a storage medium, and specifically, relates to a technique to spool print data in a printing apparatus.

Description of the Related Art

There is a case where a method is adopted in a printer used in common in an office, in which method after a user transmits print data, printed matter is not output until the user actually goes to the printer, and the output of the printed matter is started at timing of the user giving instructions to perform printing in front of the printer. Such a printing method is called "secure printing" from the viewpoint of information security. In contrast to this, a method in which the output of printed matter is started at timing of the print data as described previously being sent to the printer is called "non-secure printing".

In order to provide an environment in which the secure printing is possible, it is necessary for the printer to include a unit configured to temporarily store print data without printing the print data immediately.

Generally, to temporarily store print data is called spool and a memory area for storing spool data is called a spool buffer, and it is considered that a printer uses a NAND flash as a spool buffer.

A method of controlling a nonvolatile memory whose number of times of rewrite is limited, such as a NAND flash, is disclosed in Japanese Patent Laid-Open No. 2009-55457. Japanese Patent Laid-Open No. 2009-55457 has proposed a method of detecting a defective block of the blocks of a nonvolatile memory whose number of times of rewrite is limited and restricting a write to the nonvolatile memory in a case where the number of detected defective blocks reaches a predetermined number.

SUMMARY OF THE INVENTION

However, Japanese Patent Laid-Open No. 2009-55457 premises that it is possible to accurately grasp the number of defective blocks within the nonvolatile memory, but among products to which a NAND flash is applied, which are prevailing in recent years, there is one that is not capable of accurately grasping the number of defective blocks. For example, among products to which a NAND flash is applied, there is one called an Embedded Multi Media Card (hereinafter, eMMC). In the eMMC, a NAND flash controller and a NAND flash memory are configured as one chip and it is made possible to independently perform management and control of the memory unit inside thereof. By using the eMMC, there is an advantage that it is made possible for the printer control unit to perform a write, read, delete, and so on by issuing them as a command without the need to take into consideration complicated processing, such as wear leveling. However, in the product such as this to which a NAND flash is applied, the measures available for the printer control unit to know the contents of management and control performed by the NAD flash controller are limited and measures to know the accurate number of defective blocks are not prepared. In a case of the eMMC, the printer control unit detects information on the defective block such as this at the point in time at which alternative blocks are used by 80% by replacing the defective block that occurs within the eMMC with the alternative block, or at the point in time at which the alternative blocks almost run out and emergent measures become necessary. That is, at the point in time of the detection, the state is such that a large number of defective blocks has already occurred, and in view of that each block is used uniformly by ware leveling, the possibility that another block may become a defective block soon is strong. Because of this, even by limiting a write to the nonvolatile memory at the point in time at which information on the defective block is detected, there is a possibility that it is not possible to avoid such a problem that the printer itself will become unable to operate soon.

Consequently, in view of the problem described above, an object of the present invention is to suppress a printing apparatus from becoming unavailable due to the life of a nonvolatile memory ending before the product life specified in the specifications of the printing apparatus ends by prolonging the life of the nonvolatile memory.

The present invention is a printing apparatus including: a volatile memory; a nonvolatile memory in which a rewrite of data is performed in units of blocks and whose number of times of rewrite has an upper limit; and a management unit configured to manage a use of the volatile memory and the nonvolatile memory as a spool buffer temporarily storing print data, and the management unit limits the use of the nonvolatile memory based on an estimated life of the nonvolatile memory, which is different from state information indicating a state of a defective block of the nonvolatile memory.

Further features of the present invention will become apparent from the following description of exemplary embodiments with reference to the attached drawings.

BRIEF DESCRIPTION OF THE DRAWINGS

FIG. 6 is an explanatory diagram of Pre EOL Information;

FIG. 7 is an explanatory diagram of Device life time estimation; and

DESCRIPTION OF THE EMBODIMENTS

In the following, embodiments of the present invention are explained with reference to the drawings.

First Embodiment

About Configuration of Printing Apparatus

Figure 1:
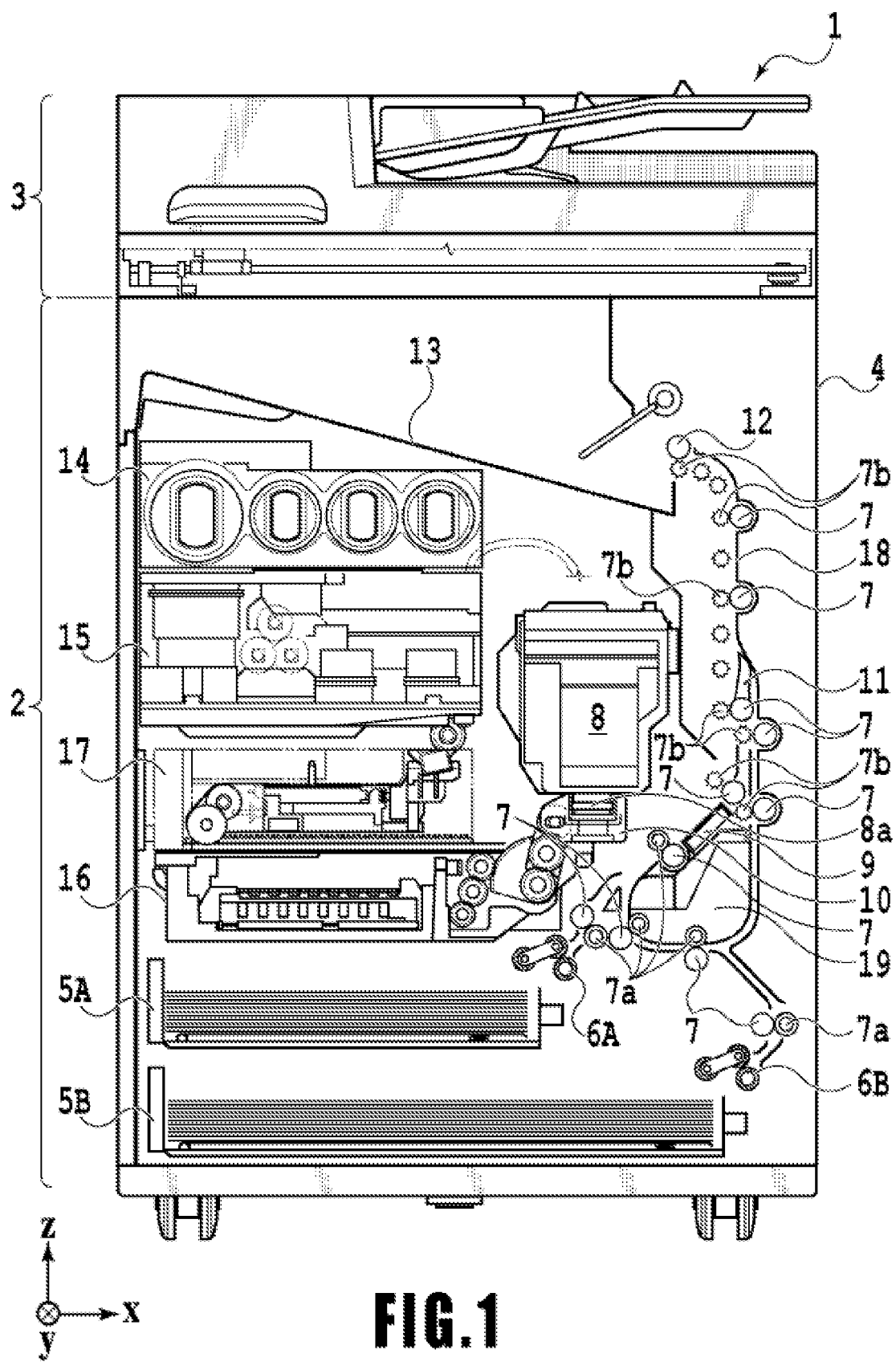
FIG. 1 is diagram in a case where a printing apparatus is in a standby state.

FIG. 1 is an internal configuration diagram of an ink jet printing apparatus 1 (hereinafter, printing apparatus 1) used in the present embodiment. In FIG. 1, the x-direction indicates the horizontal direction, the y-direction indicates the direction in which ejection ports are arrayed in a print head 8, to be described later, and the z-direction indicates the vertical direction, respectively.

The printing apparatus 1 is a multi function printer including a print unit 2 and a scanner unit 3 and capable of performing a variety of kinds of processing relating to the printing operation and the reading operation by the print unit 2 and the scanner unit 3 individually, or in an interlocking manner of the print unit 2 and the scanner unit 3. The scanner unit 3 includes an ADF (Auto Document Feeder) and an FBS (Flat Bed Scanner) and is capable of reading a document automatically fed by the ADF and reading (scanning) a document placed on a document table of the FBS by a user. The present embodiment is the multi function printer having both the print unit 2 and the scanner unit 3, but the multi function printer may be an aspect in which the scanner unit 3 is not included. FIG. 1 shows a case where the printing apparatus 1 is in a standby state where the printing apparatus 1 is performing neither the printing operation nor the reading operation.

In the print unit 2, at the bottom in the vertically downward direction of a casing 4, a first cassette 5A and a second cassette 5B for storing a printing medium (cut sheet) S are installed in an attachable and detachable manner. In the first cassette 5A, comparatively small printing media up to the A4 size, and in the second cassette 5B, comparatively large printing media up to the A3 size are stored in a piled-up manner. In the vicinity of the first cassette 5A, a first feed unit 6A for feeding stored printing media by separating one by one is provided. Similarly, in the vicinity of the second cassette 5B, a second feed unit 6B is provided. In a case where the printing operation is performed, the printing medium S is selectively fed from one of the cassettes.

A conveyance roller 7, a discharge roller 12, a pinch roller 7a, a spur 7b, a guide 18, an inner guide 19, and a flapper 11 are conveyance mechanisms for guiding the printing medium S in a predetermined direction. The conveyance roller 7 is arranged on the upstream side and on the downstream side of the print head 8 and is a drive roller that is driven by a conveyance motor, not shown schematically. The pinch roller 7a is a follower roller that nips and rotates the printing medium S together with the conveyance roller 7. The discharge roller 12 is arranged on the downstream side of the conveyance roller 7 and is a drive roller that is driven by a conveyance motor, not shown schematically. The spur 7b sandwiches and conveys the printing medium S together with the conveyance roller 7 arranged on the downstream side of the print head 8 and the discharge roller 12.

The guide 18 is provided in the conveyance path of the printing medium S and guides the printing medium S in a predetermined direction. The inner guide 19 is a member extending in the y-direction and has a curved side surface, and guides the printing medium S along the side surface. The flapper 11 is a member for switching directions in which the printing medium S is conveyed at the time of the both-side printing operation. A discharge tray 13 is a tray for loading and holding the printing medium S for which the printing operation has been completed and which is discharged by the discharge roller 12.

The print head 8 of the present embodiment is a color ink jet print head of full line type and in which a plurality of ejection ports from which ink is ejected in accordance with print data is arrayed along the y-direction in FIG. 1 so as to correspond to the width of the printing medium S. In a case where the print head 8 is at the standby position, an ejection port surface 8a of the print head 8 is capped by a cap unit 10 as shown in FIG. 1. In a case where the printing operation is performed, by a print controller 202, to be described later, the direction of the print head 8 is changed so that the ejection port surface 8a faces a platen 9. The platen 9 is configured by a flat plate extending in the y-direction and supports the printing medium S from the rear side, for which the printing operation is performed by the print head 8.

An ink tank unit 14 stores four color inks to be supplied to the print head 8, respectively. An ink supply unit 15 is provided on the way in the flow path connecting the ink tank unit 14 and the print head 8 and adjusts the pressure and the amount of flow of the ink within the print head 8 to an appropriate range. In the present embodiment, a circulation-type ink supply system is adopted and the ink supply unit 15 adjusts the pressure of the ink supplied to the print head 8 and the amount of flow of the ink recovered from the print head 8 to an appropriate range.

A maintenance unit 16 includes the cap unit 10 and a wiping unit 17 and performs the maintenance operation for the print head 8 by causing these units to operate at predetermined timing.

Figure 2:
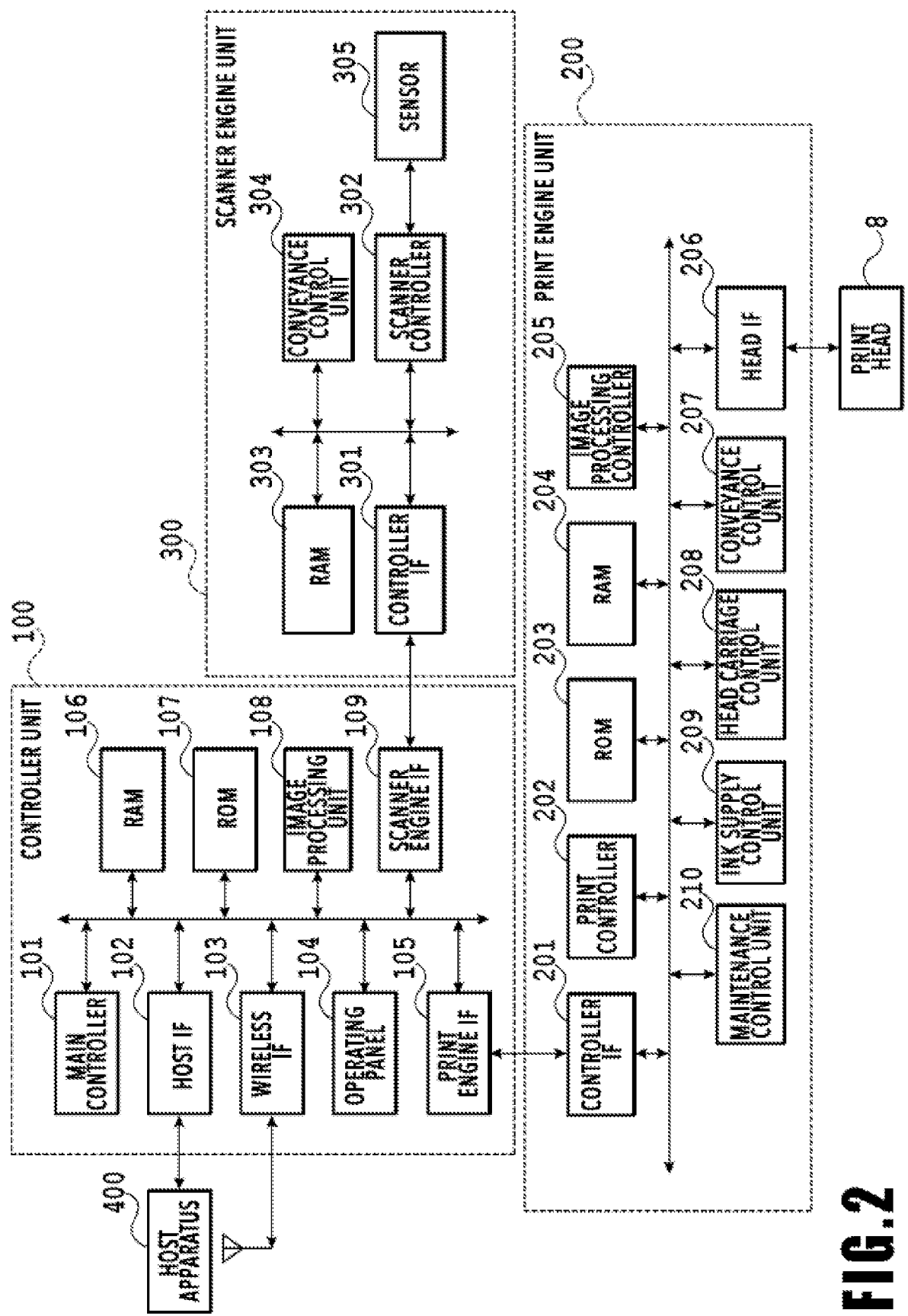
FIG. 2 is a block diagram showing a control configuration of the printing apparatus.

FIG. 2 is a block diagram showing a control configuration in the printing apparatus 1. The control configuration mainly includes a print engine unit 200 configured to centralizedly control the print unit 2, a scanner engine unit 300 configured to centralizedly control the scanner unit 3, and a controller unit 100 configured to centralizedly control the entire printing apparatus 1. The print controller 202 controls various mechanisms of the print engine unit 200 in accordance with instructions of a main controller 101 of the controller unit 100. Various mechanisms of the scanner engine unit 300 are controlled by the main controller 101 of the controller unit 100. In the following, details of the control configuration are explained.

In the controller unit 100, the main controller 101 including a CPU controls the entire printing apparatus 1 by using a RAM 106 as a work area in accordance with programs and various parameters stored in a ROM 107. For example, it is assumed that a print job is input from a host apparatus 400 via a host interface (hereinafter, interface is abbreviated to IF) 102 or a wireless IF 103. In this case, predetermined image processing is performed for image data received by an image processing unit 108 in accordance with instructions of the main controller 101. Then, the main controller 101 transmits the image data for which image processing has been performed to the print engine unit 200 via a print engine IF 105.

The printing apparatus 1 may acquire image data from the host apparatus 400 via wireless communication or wired communication or may acquire image data from an external storage device (USB memory and the like) connected to the printing apparatus 1. The communication method that is made use of for wireless communication or wired communication is not limited. For example, as the communication method that is made use of for wireless communication, it is possible to apply Wi-Fi (Wireless Fidelity) (registered trademark) and Bluetooth (registered trademark). Further, as the communication method that is made use of for wired communication, it is possible to apply USB (Universal Serial Bus) and the like. Furthermore, for example, in a case where a read command is input from the host apparatus 400, the main controller 101 transmits this command to the scanner unit 3 via a scanner engine IF 109.

An operation panel 104 is a mechanism for a user to input and output for the printing apparatus 1. It is possible for a user to give instructions as to the operation, such as copy and scan, to set a printing mode, to recognize information on the printing apparatus 1, and so on via the operation panel 104.

In the print engine unit 200, the print controller 202 including a CPU controls various mechanisms included in the print unit 2 by using a RAM 204 as a work area in accordance with programs and various parameters stored in a ROM 203. In a case where various commands and image data are received via a controller IF 201, the print controller 202 temporarily stores them in the RAM 204. The print controller 202 causes an image processing controller 205 to convert the saved image data into print data so that the print head 8 can make use of for the printing operation. In a case where print data is generated, the print controller 202 causes the print head 8 to perform the printing operation based on the print data via a head IF 206. At this time, the print controller 202 conveys the printing medium S by driving the feed units 6A and 6B, the conveyance roller 7, the discharge roller 12, and the flapper 11 shown in FIG. 1 via a conveyance control unit 207. In accordance with instructions of the print controller 202, the printing operation by the print head 8 is performed in an interlocking manner with the conveyance operation of the printing medium S and thus printing processing is performed.

A head carriage control unit 208 changes the direction and position of the print head 8 in accordance with the operating state, such as the maintenance state and the printing state, of the printing apparatus 1. An ink supply control unit 209 controls the ink supply unit 15 so that the pressure of the ink to be supplied to the print head 8 is adjusted within an appropriate range. A maintenance control unit 210 controls the operation of the cap unit 10 and the wiping unit 17 in the maintenance unit 16 at the time of performing the maintenance operation for the print head 8.

In the scanner engine unit 300, the main controller 101 controls hardware resources of a scanner controller 302 by using the RAM 106 as a work area in accordance with programs and various parameters stored in the ROM 107. Due to this, various mechanisms included in the scanner unit 3 are controlled. For example, by the main controller 101 controlling the hardware resources within the scanner controller 302 via a controller IF 301, a document mounted on the ADF by a user is conveyed via a conveyance control unit 304 and read by a sensor 305. Then, the scanner controller 302 saves the read image data in a RAM 303. It is possible for the print controller 202 to cause the print head 8 to perform the printing operation based on the image data read by the scanner controller 302 by converting the image data acquired as described above into print data.

About Detailed Configuration of Controller Unit

Figure 3:
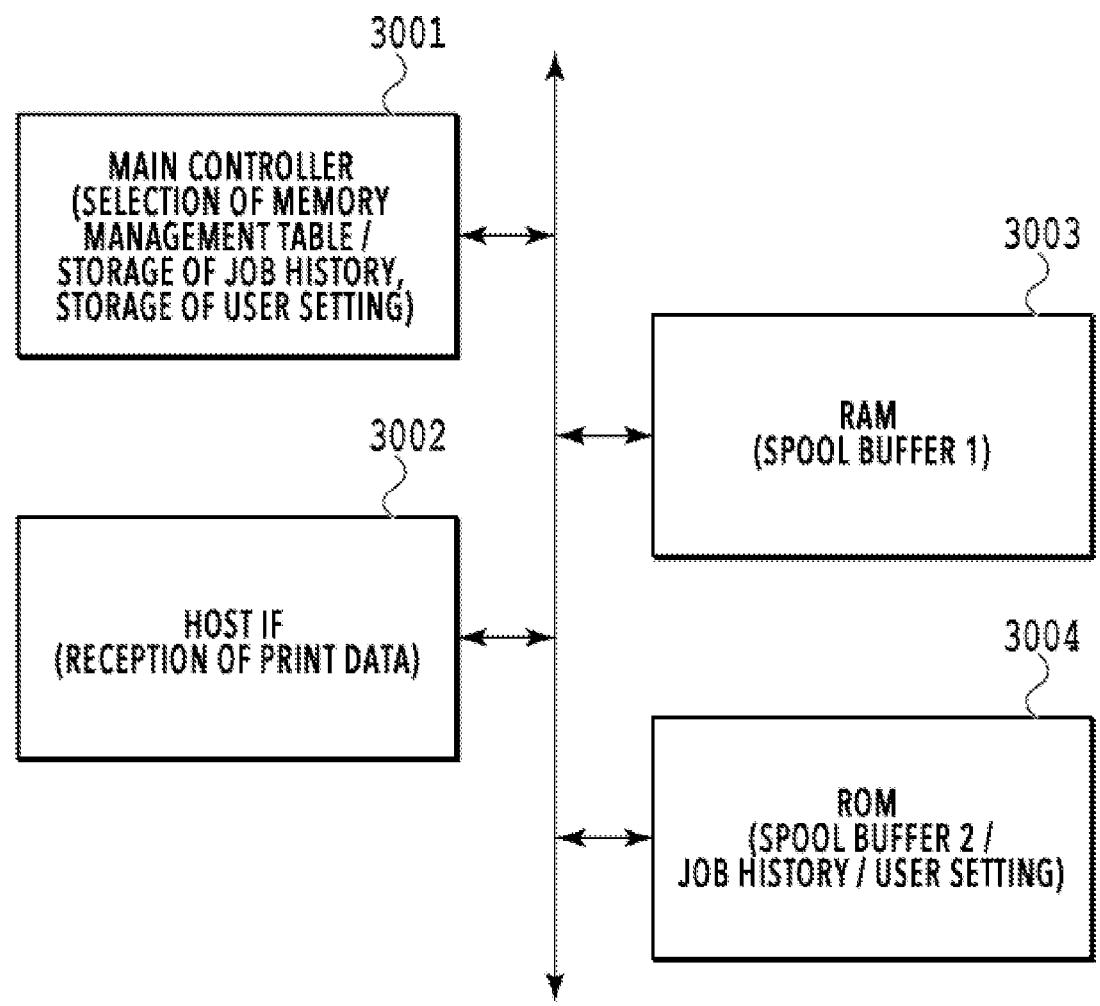
FIG. 3 is a block diagram showing a detailed configuration of a controller unit.

FIG. 3 is a block diagram showing components important particularly for the present embodiment, which are extracted from the components shown in FIG. 2. In FIG. 3, the main controller 101, the host IF 102, the RAM 106, and the ROM 107 shown in FIG. 2 are described as a main controller 3001, a host IF 3002, a RAM 3003, and a ROM 3004, respectively.

The print data received via the host IF 3002 is stored temporarily in the spool buffer of the printing apparatus 1. As described previously, the printing method includes the secure printing and the non-secure printing and in view of the use in a mixed manner of these methods, it is necessary to prepare two kinds of spool buffer for the secure printing and the non-secure printing.

In the non-secure printing, in a case where the use of the print engine unit 200 ends, the output is started sequentially. Because of this, the time during which print data for the non-secure printing stays in the printing apparatus 1 is short, and therefore, even in a case where a plurality of users transmits print data, it is possible to perform processing with a small-capacity spool buffer. Consequently, it is possible to implement the spool buffer for the non-secure printing only by the area of the RAM 3003. On the other hand, in the secure printing, in a case where a plurality of users transmits print data but the users do not give instructions to perform printing in front of the printer, there is a possibility that a large amount of print data stays in the printing apparatus 1, and therefore, a large-capacity spool buffer is necessary. Consequently, the spool buffer for the secure printing is secured both on the RAM 3003 and on the ROM 3004.

As the RAM 3003, it may also be possible to use an SRAM within an IC that controls the printing apparatus 1 or a DRAM outside the IC. In the present embodiment, the spool buffer requires a comparatively large-capacity memory area, and therefore, the use of a DRAM is supposed. Further, as the ROM 3004, it may also be possible to use a NOR flash or a NAND flash. However, from the viewpoint of the necessity of a large-capacity memory area, it is desirable to use a NAND flash and in particular, in the present embodiment, the use of an eMMC is supposed in which a controller unit configured to control wear leveling and the like is incorporated within a chip together with a NAND flash memory. As the spool area on the eMMC, a non-file system area that can be viewed directly on the memory chip from the CPU may be used, or a file system area via a file system may be used. In the present embodiment, it is assumed that the spool area on the eMMC is a non-file system area.

As described previously, the number of times of rewrite of the ROM is limited. Consequently, it is desirable to use the ROM as an auxiliary memory, in such a manner that spool data is normally stored in the RAM whose number of times of rewrite is not limited and spool data is stored in the ROM only in a case where the capacity of the spool buffer secured within the RAM is exceeded. Further, there is a case where confidential information on a user is included in print data, and therefore, unless there is a special reason, it is desirable to delete print data already printed from the printer. Consequently, in a case where spool data is stored in the RAM, even on a condition that a situation occurs in which a delete of the print data has failed, the print data within the RAM is automatically deleted at the time of the power source of the printing apparatus 1 being turned off, and therefore, this is advantageous. On the other hand, in a case where spool data is stored in the ROM, print data within the ROM is not deleted automatically even by the power source of the printing apparatus 1 being turned off, and therefore, this is disadvantageous compared to the RAM from the viewpoint of security. Further, a write occurs twice, that is, print data is stored and deleted, and therefore, the ROM is disadvantageous compared to the RAM also from the viewpoint of the limit to the number of times of rewrite. From the above, in FIG. 3, the RAM 3003 is described as a spool buffer 1, as a buffer having high priority, which is used in both the methods of the secure printing and the non-secure printing. In contrast to this, as a buffer having low priority, which is used only in the secure printing, the ROM 3004 is described as a spool buffer 2. In the present embodiment, the ROM 3004 is used as the spool buffer 2 only at the time of the secure printing and after the printing, in a case where a predetermined time has elapsed from storage and at the time of the power source of the printing apparatus 1 being turned off, the spool data is deleted without fail from the ROM 3004. One example of the spool data of the present embodiment is print data.

About Management of Memory Area

Figure 4:
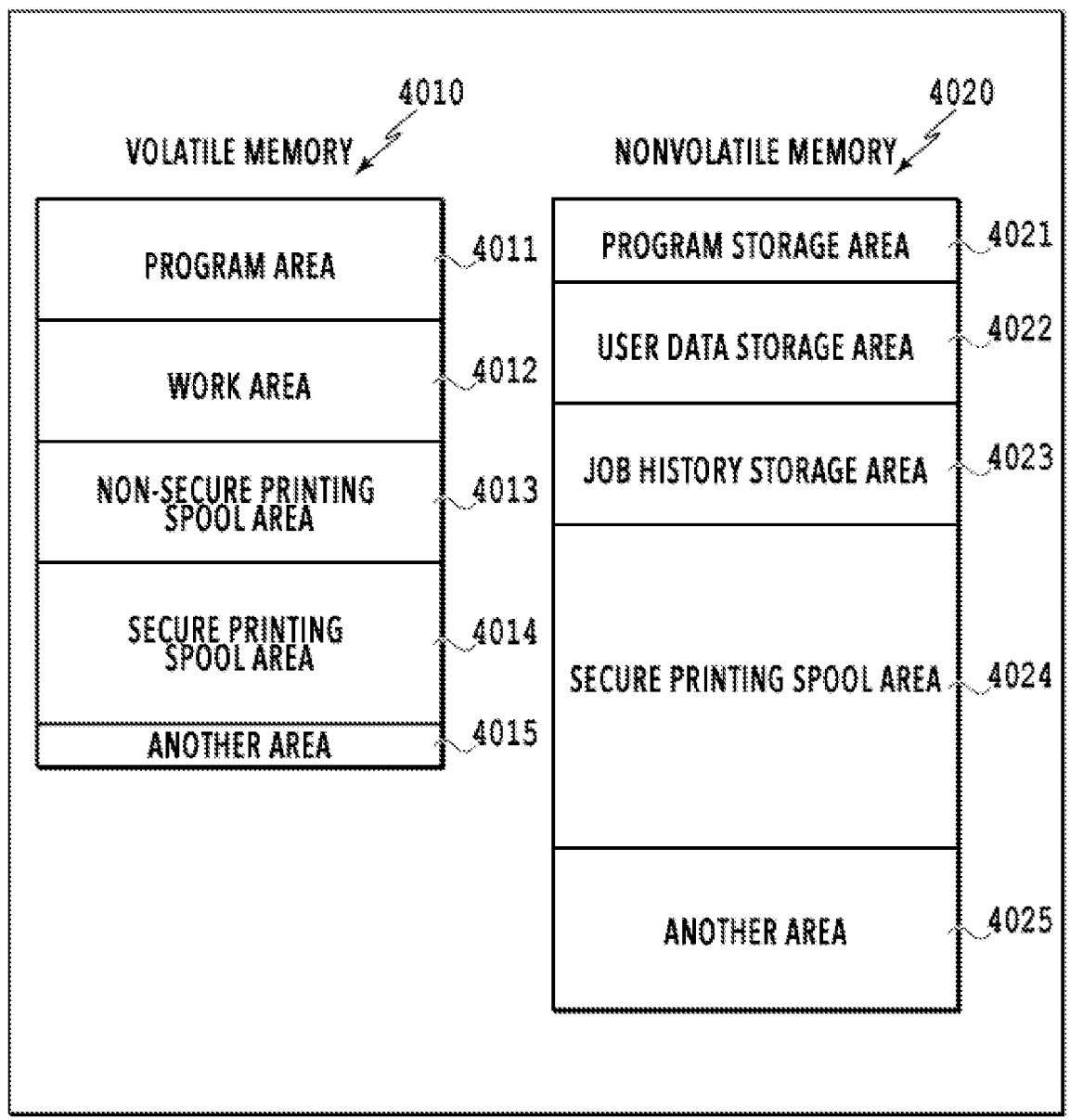
FIG. 4 is an explanatory diagram of a management method of a memory area.

In the following, management of memory areas in the ROM and the RAM described previously is explained by using FIG. 4. FIG. 4 is a diagram showing an outline of internal area management in each of the volatile memory and the nonvolatile memory. In FIG. 4, the RAM 3003 shown in FIG. 3 is described as a volatile memory 4010 and the ROM 3004 is described as a nonvolatile memory 4020.

The volatile memory 4010 includes a program area 4011, a work area 4012, a non-secure printing spool area 4013, a secure printing spool area 4014, and another area 4015. The program area 4011 is an area in which an execution program copied from the nonvolatile memory 4020 is placed and the CPU having booted fetches a program from this area and operates. However, there is a case where an execution program is fetched directly from the nonvolatile memory, and therefore, the program area in the volatile memory is not necessarily indispensable. In the work area 4012, intermediate data or the like while being subjected to processing is placed. In the non-secure printing spool area 4013, spool data used only in the non-secure printing is stored. In the secure printing spool area 4014, spool data used only in the secure printing is stored. It is possible to regard the non-secure printing spool area 4013 and the secure printing spool area 4014 as being a part of the work area in a broad sense, but here, the management method of the memory areas is referred to, and therefore, they are described separate from the work area for convenience. The other area 4015 is configured by blocks used for management within the volatile memory 4010, specifically, blocks or the like used in place of defective blocks.

The nonvolatile memory 4020 includes a program storage area 4021, a user data storage area 4022, a job history storage area 4023, a secure printing spool area 4024, and another area 4025. In the program storage area 4021, the entity of an execution program is stored. As described previously, the CPU executes a program stored in the program storage area 4021 by fetching the program by copying the program to the volatile memory 4010 or by directly fetching the program from the nonvolatile memory 4020. In the present embodiment, in the execution program stored in the program storage area 4021, information (referred to as maintenance information) used at the time of the maintenance operation for the print head is included. The maintenance information is, for example, data relating to a schedule for performing the maintenance operation at predetermined timing.

In the user data storage area 4022, user data is stored. Specifically, the user data is a telephone book and an address book of a user, information relating to various settings in the printing apparatus 1, such as the luminance of the liquid crystal display (LCD) and the volume of the UI, and so on. Information relating to the division of the spool buffer, the switching between the spool buffers to be used, and so on, which is used in the present embodiment, is also stored in the user data storage area 4022. Here, the information relating to the division of the spool buffer is, for example, the sizes of the spool area within the volatile memory 4010 and the spool area within the nonvolatile memory 4020. Further, the information relating to the switching between the spool buffers is, for example, the size of the spool data. In which of the secure printing spool area 4014 and the secure printing spool area 4024 the spool data is stored is determined depending on the size of the spool data that is stored.

In the job history storage area 4023, information on the number of print jobs received during a predetermined period of time, such as one day and one week, the size of print data, and so on is stored. In the secure printing spool area 4024, the spool data used only in the secure printing is stored and the secure printing spool area 4024 is used in a case where spool data whose size is larger than the unused capacity of the secure printing spool area 4014 within the volatile memory 4010 occurs. The other area 4025 is configured by blocks used for management within the nonvolatile memory 4020, specifically, blocks or the like used in place of defective blocks.

About Function of eMMC

Figure 5:
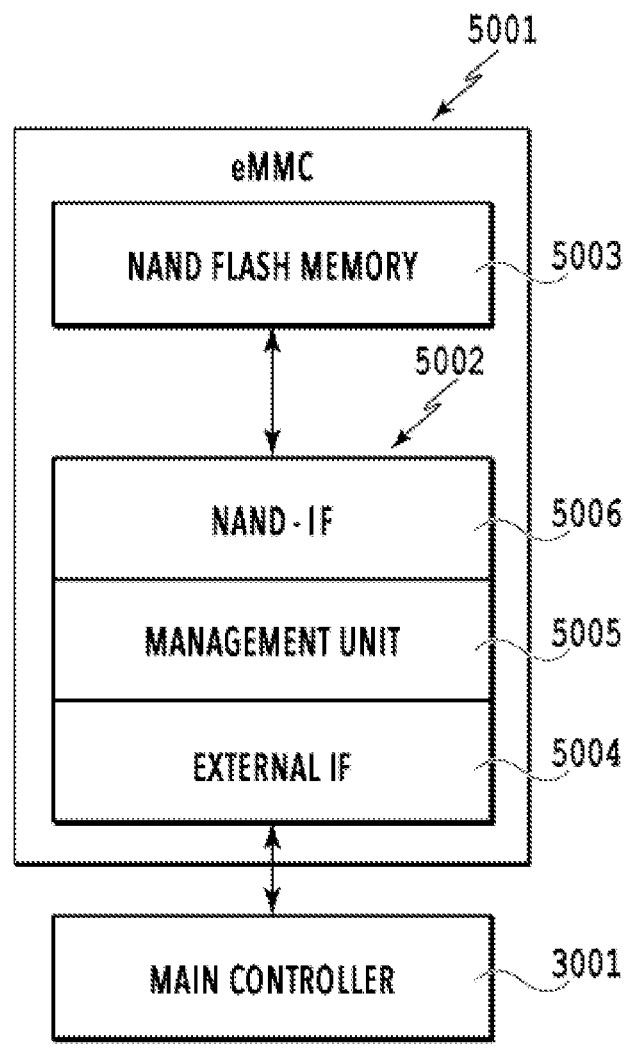
FIG. 5 is a block diagram showing a connection aspect of an eMMC and the main controller.

In the following, the function of the eMMC whose use as the nonvolatile memory 4020 is supposed is explained by using FIG. 5. FIG. 5 is a block diagram showing a connection aspect between an eMMC 5001 and the main controller 3001.

In FIG. 5, the nonvolatile memory 4020 shown in FIG. 4 is described as the eMMC 5001. As described previously, the eMMC 5001 is one in which a NAND flash controller 5002 and a NAND flash memory 5003 are configured in one chip. The NAND flash controller 5002 includes an external IF 5004, a management unit 5005, and a NAND-IF 5006. The external IF 5004 performs communication with the main controller 3001 that functions as a host based on a command. The management unit 5005 performs wear leveling, defective block management, and so on. The NAND-IF 5006 performs communication with the NAND flash memory 5003 within the eMMC 5001.

The management unit 5005 has various registers. The registers include an operation condition register (OCR) holding operation conditions of the eMMC 5001 itself and a register holding data (Device Specific Data) indicating characteristics of the eMMC 5001. Conventionally, the Device Specific Data is also called Card Specific Data because of being compatible with an MMC card, and therefore, in the present specification, this is abbreviated to CSD and a register holding the CSD is called a CSD register.

Among the CSD registers, for an extended CSD register that is specified by the Joint Electron Device Engineering Council (JEDEC) and to which a function is added frequently each time of updating of the standard, an item indicating information on the corresponding function and the setting thereof, and the internal state is prepared. In particular, after Version 5.0, an item of Pre EOL INFORMATION (hereinafter, PRE_EOL_INFO) indicating the state of the alternative block corresponding to a defective block is added.

Further, an item of Device life time estimation that enables estimation of the life of the eMMC is also added. That is, the nonvolatile memory 4020 of the present embodiment holds the state information (FIG. 6) indicating the state of defective blocks of the nonvolatile memory 4020 and the estimated life (FIG. 7) of the nonvolatile memory 4020 different from FIG. 6. In this item, 0x00 to 0x0A are specified as values corresponding to those obtained by dividing the sum total of the average number of times of rewrite of each block, corresponding to the number of blocks, by the total durable number of times of rewrite of all the blocks. By using the Device life time estimation, it is made possible for the main controller 3001 to detect the internal state before the life of the eMMC ends.

However, even a case where such a register is used is not sufficient depending on the usage pattern. For example, the number of states that the PRE_EOL_INFO can detect is only three as shown in FIG. 6, and therefore, there is a case where even though the state is detected at the point in time at which 80% of the prepared alternative blocks are replaced and consumed, the timing is too late. The reason is that as the characteristics of the NAND flash, a block whose number of times of rewrite exceeds the durable number of times of rewrite is likely to become a defective block and in the state where there occur many defective blocks, the number of times of rewrite is made uniform by wear leveling, and therefore, the possibility that another normal block becomes a defective block soon is strong. Consequently, there is a possibility that the timing is too late even by suspending the use as the spool buffer for the secure printing, whose frequency of rewrite is high, at this point in time, that is, there is a possibility that a normal block soon progresses to a defective block by the subsequent rewrite to another normal block. In such a case, the life of the eMMC becomes almost the life of the product.

On the other hand, the main role of the secure printing spool buffer is to reduce the wait time until the completion of print data input by a user due to the stay of data described previously and there are many who prefer prolongation of the wait time to unavailability of the product. Because of this, as the acceptable timing as the product, it is desirable to suspend the use as the spool buffer before a defective block occurs, or in the stage where the remaining number of times of rewire to each block is sufficient for the durable number of times. Consequently, in the present invention, before the data write to the eMMC 5001, the main controller 3001 refers to the value of the Device life time estimation described previously. Then, in a case where the value that is referred to is larger than or equal to a predetermined value, it is regarded that the life of the eMMC is approaching the end and a warning is issued to a user after suspending the use as the spool buffer and a user is prompted to prepare measures for prolonging the product life, such as repairs.

It is possible for the Device life time estimation to represent the state of a device at ten levels by using the values of 0x00 to 0x0A as shown in FIG. 7. The reason the life is an estimation here is that the number of times of rewrite of each block is made uniform by the wear leveling processing, but some variations occur without fail due to the internal state, and therefore, the number of times of rewrite is calculated as an average value of all the blocks.

Further, in detail, the Device life time estimation includes Type A and Type B and the contents indicated by each value are specified in common by the JEDEC as described previously, but how to use type A and type B in accordance with a situation is not specified. Because of this, the use methods are different for different device vendors. However, in general, type A and type B are used in accordance with the storage system in the NAND flash memory configuring the eMMC. The storage system here refers to the storage density at which each cell stores data or the like. In recent years, the number of bits of data to be stored in one cell increases so as to be compatible with a large capacity.

Normally, data that is stored in one cell is stored by the Single-Level Cell (hereinafter, SLC) system in which determination is performed by two values, one bit, that is, whether or not there is charge in the target cell. In contrast to this, a multibit device, for example, a device adopting the Multi-level Cell (hereinafter, MLC) system as a storage system may take one of states at four levels (that is, two bits) as the voltage state within one cell. Because of this, compared to the SLC, the MLC has a merit that it is easy to increase the capacity because of the capability to store data twice that in a case of the SLC, but there are also demerits, such as the write time is prolonged compared to the SLC with the same capacity, the durable number of times of rewrite in units of blocks is reduced, and so on. In the present embodiment, it is supposed to use the eMMC that incorporates an MLC system NAND flash memory.

The priority of the merits and the demerits described previously is different depending on a product on which the NAND flash memory is mounted, and therefore, as one of the measures to avoid this, a storage system called a pseudo SLC is prepared that enables data storage by using the voltage states at two levels as in the case with the SLC for the MLC system cell. Because of this, one of Type A and Type B of the Device life time estimation indicates the life estimation in a case where data or the like is stored by the default storage system (here, MLC system) in the NAND flash memory within the eMMC. The other indicates the life estimation in a case where data or the like is stored by the pseudo SLC system.

For a multibit device, there is also a system called the Triple-Level Cell (hereinafter, TLC) capable of storage with three bits per cell by using the voltage states at eight levels, or the like. In this case also, as in the case described previously, one of Type A and Type B of the Device life time estimation indicates the life estimation in a case where data or the like is stored by the default storage system (here, TLC system). The other indicates the life estimation for the pseudo SLC system.

The present embodiment does not make clear which of Type A and Type B indicates the life estimation in a case where data or the like is stored by the default storage system or the pseudo SLC storage system. Even in a case where whatever the storage system is used, an object is to suspend the use as the spool buffer of the nonvolatile memory whose number of times of rewrite is limited at appropriate timing.

About Spool Data Write Processing for Nonvolatile Memory

Here, an example of the object in the present embodiment is explained in detail. The spool buffer is frequently implemented by making use of a DRAM, which is a volatile memory, an HDD, which is a nonvolatile memory, or the like. The spool buffer is an area that temporarily stores print data during the period of time from a user inputting printing instructions until printed matter being output, and unless there is a special reason, it is not necessary to hold the print data after printing. In particular, in the secure printing, from the security viewpoint, it is desirable to delete print data from the spool buffer immediately after the completion of printing, and therefore, a DRAM, which is a volatile memory, is suitable as the spool buffer.

However, the price per unit memory capacity of a DRAM is comparatively expensive, and therefore, it is desirable to keep the used capacity to a required minimum and in a case where a part of the limited capacity is used as the spool buffer, there is a possibility that the capacity is not enough to store print data transmitted by a plurality of users. Because of this, an HDD whose price per unit memory capacity is comparatively inexpensive is used frequently as the spool buffer, but in an HDD, there is a possibility that a mechanical failure occurs, such as deterioration of the rotation mechanism of a disk over time, and further, there is such a problem that comparatively large operation power is necessary. As measures to solve these problems, it is considered to use a nonvolatile semiconductor memory, such as a NAND flash. In recent years, the price of the NAND flash is decreasing and the capacity of the NAND flash is increasing, and therefore, the NAND flash is made use of to store program data, user data, and so on in place of the HDD, and the use thereof is extended.

However, the number of times of rewrite of the NAND flash is limited and there is such a problem that it is no longer possible to use a block whose number of times of rewrite exceeds a permitted number of times of rewrite because of repetition of rewrite. Here, a rewrite refers to a set of a delete and a write. The block that can no longer be used is handled as a defective block and this problem is dealt with by allocating an unused block within the NAND flash as an alternative block. However, in a case where the number of defective blocks increases so that it is not possible to allocate an alternative block, the NAND flash enters a state where it is not possible to use the NAND flash as a memory having a specified capacity. Because of this, equalization processing called wear leveling is performed. The life of the NAND flash prolongs by the NAND flash controller managing and controlling a rewrite to each block within the NAND flash so that the rewrite of each block is made uniform by the equalization processing and by allocating an alternative block.

In general, a NAND flash controller is connected with a NAND flash memory and configured within an ASIC incorporating a CPU, or configured so as to connect with a CPU as a separate device capable of directly communicating with the CPU. With the configuration such as this, the NAND flash controller performs control of the NAND flash memory based on the control from the CPU. In general, it is possible to perform a write and a read in the NAND flash in units of so-called pages, which is a set of memory cells, and to perform a delete in units of so-called blocks, which is a set of pages. Further, because of the internal structure, it is not possible to directly rewrite already-saved data and it is necessary to read rewrite-target data from a target page onto a DRAM or the like and to write to another page, which is already deleted, after a rewrite of a necessary portion. At this time, in a case of deleting the original target page in which the data before a rewrite was stored, it is necessary to read also data, which is not a delete target, within the same block and to perform a write to another block. Because of this, in a case where the NAND flash is used as a part of the spool buffer as described previously, the frequency of delete becomes high because the spool data basically changes each time of printing. That is, depending on the use, there is a possibility that it is no longer possible for the NAND flash to store the capacity specified by the specifications before the life of the printer as a product (durable number of output sheets) is reached. As a result, in a case where the NAND flash is also used to store control programs, log data, and so on of the printer, there is a possibility that the printer itself becomes no longer capable of operating. It is possible to solve such problems by performing the processing in FIG. 8.

Figure 8:
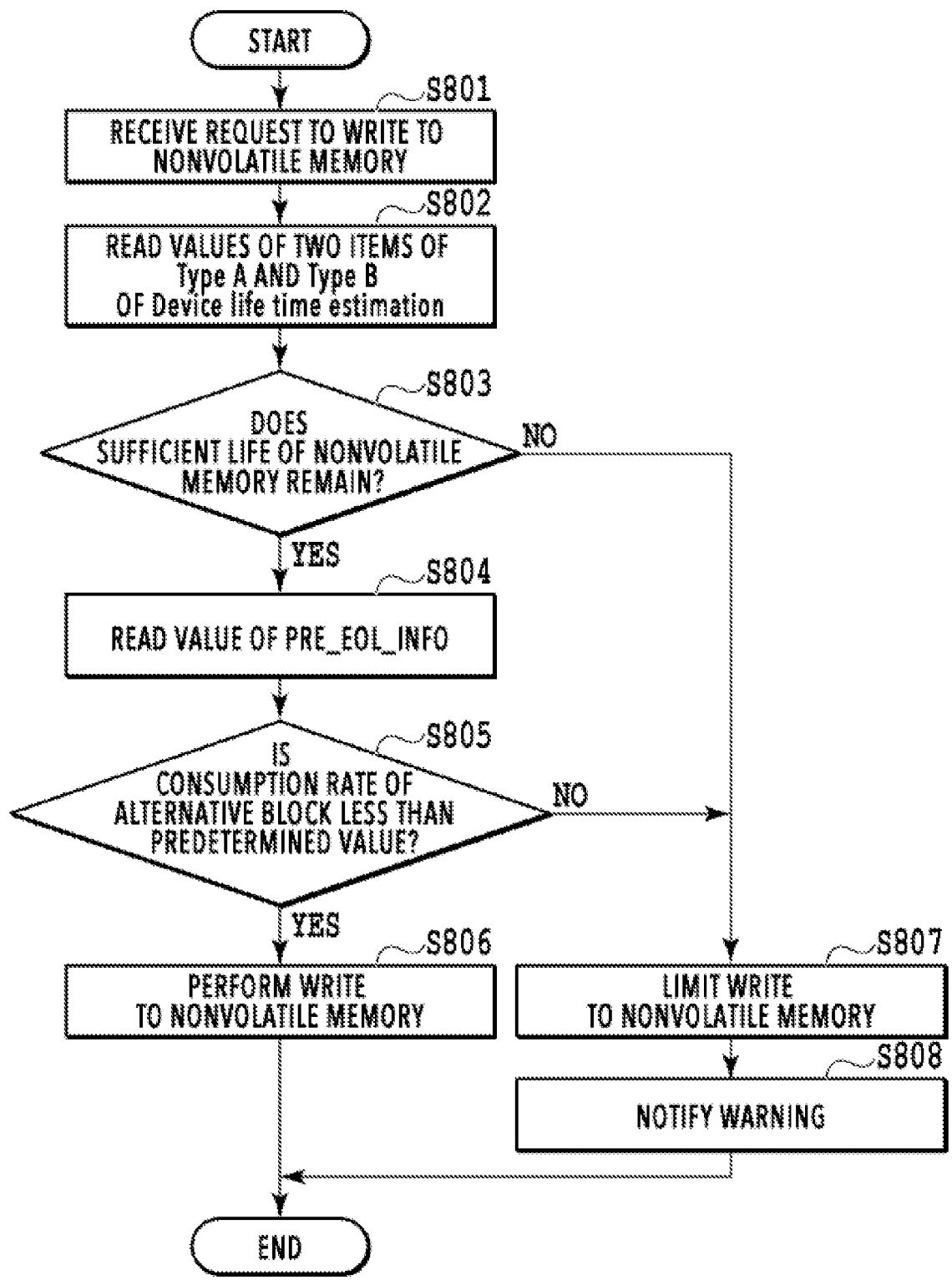
FIG. 8 is a flowchart of spool data write processing for a nonvolatile memory.

In the following, the spool data write processing for a nonvolatile memory accompanied by determination of whether to continuously use the spool buffer for the secure printing within the nonvolatile memory or to limit the use of the spool buffer in the present embodiment is explained by using FIG. 8. The flowchart in FIG. 8 is started in a case where secure print data is received.

At S801, the main controller 3001 receives a request to write to the ROM 3004, which is the eMMC, or determines that a write to the ROM 3004 is necessary. For example, in a case of determining that it is not possible to save all the received secure print data in the RAM 3003, the main controller 3001 determines that a write to the ROM 3004 is necessary.

At S802, the main controller 3001 reads the values of the two items of Type A and Type B of the Device life time estimation held in the extended CSD register.

At S803, the main controller 3001 determines whether the sufficient life of the ROM 3004 remains by using the values read at S802. Specifically, in the present embodiment, whether each value of the two items read at S802 does not exceed a predetermined value is determined. In a case where the determination results at this step are affirmative, it is regarded that the sufficient life of the ROM 3004 remains and the processing advances to S804. On the other hand, in a case where the determination results are negative, the processing advances to S807. Here, whether each value of the two items of Type A and Type B of the Device life time estimation does not exceed a predetermined value is determined, but the present invention is not limited to this aspect. For example, it may also be possible to compare the value of Type A and the value of Type B and to determine whether the value, which is larger of these two values, does not exceed a predetermined value. For example, it may also be possible to determine whether or not the value "0×09" is received as a result of an inquiry to the ROM 3004. That is, this processing corresponds to the determination of whether or not the main controller 3001 receives a value indicating that 90 to 100% of the device life has been used.

At S804, the main controller 3001 reads the value of the PRE_EOL_INFO held in the extended CSD register.

At S805, the main controller 3001 determines whether the consumption rate of the alternative block is less than a predetermined value by using the value read at S804. Specifically, whether the value of the PRE_EOL_INFO read at S804 is "0×01", that is, whether the consumption rate of the alternative block is less than 80% is determined. In a case where the determination results at this step are affirmative, the processing advances to S806. On the other hand, in a case where the determination results are negative, the processing advances to S807. It is also possible to omit this step.

At S806, the main controller 3001 performs a write to the ROM 3004 in accordance with the write request received at S801. For example, the main controller 3001 stores print data for the secure printing in the ROM 3004.

At S807, the main controller 3001 limits the use of the ROM 3004 as the secure printing spool buffer. By this step, the subsequent write of spool data to the ROM 3004 is prohibited. The print data already stored in the secure printing spool area 4024 within the ROM 3004 is kept being held until a delete after the completion of the printing based on the print data or after the elapse of a predetermined time is performed. The empty block from which print data has been deleted is made use of as a wear leveling processing area.

At S808, the main controller 3001 notifies, via the operation panel 104, a user of a warning to the effect that the capacity of the spool buffer is reduced because the life of the ROM 3004 is approaching the end and prompts a user to take measures, such as repairs, before it becomes no longer possible to use the product. It may also be possible to notify a user of the warning through a driver or the like in the host apparatus connected via the host IF 3002 in place of notifying a user of the warning via the operation panel 104. The above is the contents of the spool data write processing for the nonvolatile memory in the present embodiment.

About Effect and Modification Example of the Present Embodiment

In the present embodiment, as described previously, the use of the nonvolatile memory as the spool buffer is limited before the life of the nonvolatile memory ends. Due to this, it is made possible to prolong the life of the nonvolatile memory and to suppress the printing apparatus from becoming unavailable due to the life of the nonvolatile memory ending before the product life of the printing apparatus specified by the specifications is reached. Further, it is made possible for a user to take measures with a plenty of time by notifying the user in advance that the life of the nonvolatile memory is approaching the end and repairs are necessary.

Further, because of the nature of the secure printing, it is required to delete the saved data without fail, but in a case where the alternative block has run out, the eMMC becomes a read only memory, and therefore, there is a possibility that it is no longer possible to delete the data saved last in a case where the eMMC is used to the limit of the life. In the present embodiment, it is also possible to suppress the possibility such as this that it becomes no longer possible to delete data because the estimated life is derived before the write.

It is needless to say that it is necessary for the product to prepare a sufficient size of the spool buffer area for the secure printing in accordance with a scenario corresponding to the supposed use conditions. That is, the present embodiment is applied to an exceptional case, such as a case where in the secure printing spool area 4014 within the volatile memory 4010, data that is not deleted until a timeout is saved at all times and the secure printing spool area 4024 within the nonvolatile memory 4020 is used frequently.

Further, in the explanation described previously, the value of each item of Type A and Type B of the Device life time estimation and the PRE_EOL_INFO is read and referred to at necessary timing. However, these values are held in the same extended CSD register, and therefore, it may also be possible to read the values at the same time immediately after the reception of a request to write to the nonvolatile memory and to use the values.

Further, in the explanation described previously, the case is explained where the eMMC is used, but it is also possible to apply the present embodiment to a case where the eMMC is not used, for example, a case where the NAND-IF and the NAND controller are provided within the main controller and connected directly with the NAND flash memory. In this case, the NAND controller has a function to perform the management of a defective block, the wear level processing, and the derivation of the number of times of rewrite and the estimated life of each block.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present invention, it is made possible to suppress a printing apparatus from becoming unavailable due to the life of a nonvolatile memory ending.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
    a volatile memory;
    a nonvolatile memory;
    a using unit configured to use the nonvolatile memory for storing print data in a case where an estimated life of the nonvolatile memory different from state information indicating a state of a defective block of the nonvolatile memory is determined to remain more than or equal to a predetermined value and the nonvolatile memory is in a data writable state; and
    a limiting unit configured to limit the use of the nonvolatile memory for storing print data in a case where the estimated life of the nonvolatile memory is determined not to remain more than or equal to the predetermined value and the nonvolatile memory is in the data writable state,
    wherein the using unit and the limiting unit are implemented by at least one processor of the printing apparatus.

2. The printing apparatus according to claim 1, further comprising:
    a derivation unit configured to derive the estimated life, wherein the derivation unit is implemented by the at least one processor of the printing apparatus.

3. The printing apparatus according to claim 2, wherein the nonvolatile memory is capable of storing data in one of a first storage system and a second storage system and
    the derivation unit derives the estimated life in accordance with a storage system adopted in the nonvolatile memory.

4. The printing apparatus according to claim 3, wherein the first storage system and the second storage system are two of a Single-Level Cell system, a Multi-Level Cell system, and a Triple-Level Cell system.

5. The printing apparatus according to claim 2, wherein the derivation unit derives the estimated life by dividing a sum total of an average number of times of rewrite of each block, corresponding to a number of blocks, of the nonvolatile memory by a total durable number of times of rewrite of all blocks of the nonvolatile memory.

6. The printing apparatus according to claim 5, wherein the limiting unit limits the use of the nonvolatile memory in a case where the derived estimated life is more than or equal to a predetermined value and the using unit uses the nonvolatile memory in a case where the derived estimated life is less than the predetermined value.

7. The printing apparatus according to claim 2, wherein the nonvolatile memory and the derivation unit are included in a one-chip eMMC.

8. The printing apparatus according to claim 1, wherein the estimated life is a value of Device life time estimation.

9. The printing apparatus according to claim 1, wherein,
in a spool buffer in the volatile memory, print data of secure printing and print data of non-secure printing are stored,
in a spool buffer in the nonvolatile memory, the print data of secure printing is stored, and
the print data of secure printing is printed by giving instructions to perform printing in front of the printing apparatus after the print data of secure printing is transmitted to the printing apparatus.

10. The printing apparatus according to claim 1 further comprising a determination unit configured to determine whether to limit the use of the nonvolatile memory before processing to write to the nonvolatile memory is performed in a case where a request to write to the nonvolatile memory is received or in a case of determining that a write to the nonvolatile memory is necessary,
wherein the determination unit is implemented by the at least one processor of the printing apparatus.

11. The printing apparatus according to claim 1, wherein the limit of the use of the nonvolatile memory refers to prohibiting writing the print data to the nonvolatile memory.

12. The printing apparatus according to claim 1, wherein state information indicating a state of a defective block of the nonvolatile memory and information indicating the estimated life are held in the nonvolatile memory.

13. A control method executed by a processor of a printing apparatus comprising:
a volatile memory; and
a nonvolatile memory, the control method comprising:
using the nonvolatile memory for storing print data in a case where an estimated life of the nonvolatile memory different from state information indicating a state of a defective block of the nonvolatile memory is determined to remain more than or equal to a predetermined value and the nonvolatile memory is in a data writable state; and
limiting the use of the nonvolatile memory for storing print data in a case where the estimated life of the nonvolatile memory is determined not to remain more than or equal to the predetermined value and the nonvolatile memory is in the data writable state.

14. The control method according to claim 13, further comprising deriving the estimated life.

15. The control method according to claim 14, wherein,
the nonvolatile memory is capable of storing data in one of a first storage system and a second storage system and
the estimated life in accordance with a storage system adopted in the nonvolatile memory is derived.

16. The control method according to claim 15, wherein the first storage system and the second storage system are two of a Single-Level Cell system, a Multi-Level Cell system, and a Triple-Level Cell system.

17. The control method according to claim 14, wherein the estimated life is derived by dividing a sum total of an average number of times of rewrite of each block, corresponding to a number of blocks, of the nonvolatile memory by a total durable number of times of rewrite of all blocks of the nonvolatile memory.

18. The control method according to claim 17, wherein the use of the nonvolatile memory is limited in a case where the derived estimated life is more than or equal to a predetermined value and the use of the nonvolatile memory is not limited in a case where the derived estimated life is less than the predetermined value.

19. The control method according to claim 13, wherein the estimated life is a value of Device life time estimation.

20. The control method according to claim 13, wherein,
in a spool buffer in the volatile memory, print data of secure printing and print data of non-secure printing are stored,
in a spool buffer in the nonvolatile memory, the print data of secure printing is stored, and
the print data of secure printing is printed by giving instructions to perform printing in front of the printing apparatus after the print data of secure printing is transmitted to the printing apparatus.

21. The control method according to claim 13, further comprising:
determining whether to limit the use of the nonvolatile memory before processing to write to the nonvolatile memory is performed in a case where a request to write to the nonvolatile memory is received or in a case of determining that a write to the nonvolatile memory is necessary.

22. The control method according to claim 13, wherein the limit of the use of the nonvolatile memory refers to prohibiting writing the print data to the nonvolatile memory.

23. The control method according to claim 13, wherein, state information indicating a state of a defective block of the nonvolatile memory and information indicating the estimated life are held in the nonvolatile memory.

* * * * *